Patented Jan. 8, 1929.

1,698,539

UNITED STATES PATENT OFFICE.

WILLIAM EGGERT, JR., OF BRIGHTWATERS, NEW YORK.

METHOD OF TREATING COTTON PLANTS.

No Drawing. Original application filed December 22, 1924, Serial No. 757,441. Patent No. 1,686,964. Divided and this application filed December 31, 1925. Serial No. 78,538.

This invention relates to improvements in methods of treating cotton plants and has among its objects the provision of methods and means for improving the quality, increasing the yield, repelling insect attacks, and retarding deterioration as hereinafter described.

Other objects and advantages will be apparent from the following description, and the invention will be specifically pointed out in the appended claims.

The subject matter of this invention was disclosed in my copending application for Letters Patent for methods of treating plants, filed December 22, 1924, which has matured into Patent No. 1,686,964, but is not claimed therein, this application being a division of said copending application.

For the purpose of obtaining an improved seed from cotton plants, I make use of the blossoms, stems and adjacent leaves of cotton plants of the same variety as those to be treated, and prepare from them a putrefied liquid extract to which I shall hereafter refer as "mother's milk." The blossoms, leaves and stems are placed in a crock or barrel, weighted down, covered with water and kept in a temperature favorable for fermentation. After five days of the first stage of alcoholic fermentation the contents of the barrel or crock should be macerated and permitted to ferment for a second period of five to ten days through the putrefactive fermentation stage, at the end of which period the mass is pressed and strained, the resultant fluid being what I have referred to as mother's milk.

If desired, a suitable vegetable material of another variety of plant may be added to the materials used in fermentation, to induce the plant to which it is to be applied as food to take it into its system by absorption through the roots. When such added material is not freely soluble in water it is necessary to boil the additional material in a mixture of water and ashes obtained from the variety of plant intended to be fed for the purpose of producing improved seeds with firmer inclinations of desired description. The proportion of ashes and vegetable product to be added should be about one pound of ashes and about one pound of selected vegetable product to one gallon of water; all to be boiled together for about one-half hour; then strained through a very loose cloth or coarse sieve, so that the ashes may remain in the fluid. This solution of ashes is to be added to the putrefied liquid extract after the latter is entirely through the fermenting process, at the rate of one gallon of ashes solution to four gallons of mother's milk.

There should also be added to the mother's milk preparation a saccharine compound such as molasses, honey or sugar, the proportions being variable according to the results desired. A suitable mixture has been obtained by using two pounds of saccharine compound with each five gallons of mother's milk.

The resultant mixture may be applied to the plant at its roots in a basin-like formation of the soil around its stalk during the blossoming period, the soil to be formed as a basin of approximately three inches in depth and ten inches in diameter. The absorption may be facilitated by thrusting a slender stick down through the deposited fluid into the soil below for about six inches in several directions. When the preparation has been absorbed by the soil about the plant, the soil used as a wall to form the basin is brushed into the basin, leaving the surface about the plant the same as it was before. The blossoming period of cotton extends over a period of three months or longer, and it is preferable to treat the plant as above described once in each month during said blossoming period.

Seeds from the cotton plant so treated are kept and planted in the following season, some being planted for the production of a small experimental crop to determine the extent of improvement in the product, and the remainder being used for growing new seed plants. The new seed plants, grown from the improved seeds, are treated in the same manner as were their parent plants, and if desired such treatments may be repeated for several successive years, by which method improved seeds are obtained which may be used for general crop purposes to raise greatly improved products.

By this method of treating plants I have obtained finer qualities, greater uniformity, and a far greater control over inclination to vary than were obtained through years of hybridizing and cross-breeding.

The putrefied liquid extract or mother's milk is substantially a liquid extract and concentration intended to furnish to each seed plant about ten times as much of its juices, etc., as the plant contains, and includes many times as much saccharine compound as would trickle to its roots when the blossoms are filled with rain to overflowing.

I have stated that a suitable vegetable material of another variety of plant may be added to the putrefied liquid extract. In this connection, I prefer to use green sassafras leaves and blossoms which I have found to induce insect-repelling properties, while at the same time producing a finer fibre.

From the foregoing it will be evident that I have produced an improved method of treating cotton plants. The invention is susceptible of modification, and the right is herein reserved to make such changes as fall within the scope of the appended claims without departing from the spirit of the invention.

Having thus described my invention, what I claim is:

1. The method of treating seed-producing cotton plants consisting in supplying to the roots of the plant during its blossoming period a fermented solution of cotton plant leaves and blossoms with a saccharine compound combined with an extract of sassafras leaves.

2. The method of treating seed-producing cotton plants consisting in supplying to the roots of the plant during its blossoming period a putrefied liquid extract of cotton leaves and blossoms combined with an extract of sassafras leaves, and repeating the treatment in successive years to plants grown from the improved seeds produced in the previous year.

3. The improved products of cotton plants consisting of products of the desired variety of cottom which has been treated with a putrefied liquid extract of cotton leaves and blossoms combined with an extract of sassafras leaves, the products being characterized by a change as compared with the original plant whereby said products have a finer fiber and have insect-repelling properties.

WILLIAM EGGERT, Jr.